(12) United States Patent
Nakakura (10) Patent No.: US 9,828,059 B2
(45) Date of Patent: Nov. 28, 2017

(54) BICYCLE DISC BRAKE CALIPER WITH BRAKE PAD SPACER

(71) Applicant: Shimano, Inc., Sakai-shi, Osaka (JP)

(72) Inventor: Masahiro Nakakura, Sakai (JP)

(73) Assignee: Shimano, Inc., Sakai-shi, Osaka (JP)

( * ) Notice: Subject to any disclaimer, the term of this patent is extended or adjusted under 35 U.S.C. 154(b) by 0 days.

(21) Appl. No.: 15/097,200

(22) Filed: Apr. 12, 2016

(65) Prior Publication Data

US 2017/0291659 A1 Oct. 12, 2017

(51) Int. Cl.
*B62L 3/02* (2006.01)
*F16D 65/00* (2006.01)
*F16D 55/225* (2006.01)
*F16D 55/00* (2006.01)

(52) U.S. Cl.
CPC ............ *B62L 3/023* (2013.01); *F16D 55/225* (2013.01); *F16D 65/0068* (2013.01); *F16D 2055/0016* (2013.01)

(58) Field of Classification Search
CPC ...... B62L 3/023; F16D 55/225; F16D 65/005; F16D 65/0056; F16D 65/0068; F16D 65/092; F16D 2055/0016; F16D 2055/0008
See application file for complete search history.

(56) References Cited

U.S. PATENT DOCUMENTS

| | | | |
|---|---|---|---|
| 6,318,514 B1 * | 11/2001 | Hinkens | B60T 11/22 188/73.32 |
| 7,261,188 B2 * | 8/2007 | Kariyama | B62L 1/005 188/26 |
| 2008/0000729 A1 * | 1/2008 | Takizawa | B62L 1/005 188/26 |
| 2013/0048444 A1 | 2/2013 | Hirotomi et al. | |

FOREIGN PATENT DOCUMENTS

| | | | | |
|---|---|---|---|---|
| DE | 2718427 A1 * | 11/1978 | .......... | F16D 65/095 |
| DE | 19610612 C1 * | 9/1997 | ............ | F16D 55/22 |
| GB | 2177766 A * | 1/1987 | ............ | F16D 65/092 |
| SE | EP 2835553 A1 * | 2/2015 | ............. | F16D 55/00 |

OTHER PUBLICATIONS

EPO machine translation, DE 19610612 C1, Sep. 1997.*

* cited by examiner

*Primary Examiner* — Thomas J Williams
(74) *Attorney, Agent, or Firm* — Alleman Hall Creasman & Tuttle LLP (57) ABSTRACT

A bicycle disc brake caliper is provided that may include a caliper body with a brake disc slot configured to at least partially accommodate a disc brake rotor removably arranged therein, first and second brake pads movably arranged in the brake disc slot relative to one another to contact the disc brake rotor arranged at least partially in a space between the first and second brake pads, and a spacer movably attached to the caliper body. The spacer may be (Continued)

configured to be positioned in a first position outside the space when the disc brake rotor is arranged in the brake disc slot, and the spacer may be configured to move from the first position to a second position in which the spacer is positioned in the space when the disc brake rotor is removed from the brake disc slot.

15 Claims, 11 Drawing Sheets

BICYCLE DISC BRAKE CALIPER WITH BRAKE PAD SPACER

BACKGROUND

A typical disc brake caliper for a bicycle wheel includes a caliper housing, a piston or pistons, and two brake pads. The brake pads are positioned on either side of a rotor. Upon actuation of a braking device, the piston or pistons are configured to cause the brake pads come into contact with the rotor, thereby applying frictional resistance and causing the bicycle to slow down or stop. When the rotor is not present between the two brake pads, accidental actuation of a braking device can cause the brake pads to stick to one another. In some use cases, such as during the course of a bicycle road race, participants change their wheels frequently. When a participant replaces a wheel that has a disk rotor built in, and the participant inadvertently operates the brake levers while the wheel and disk rotor are removed from the disk brake caliper, the brake pads may not return to their original positions after the participant releases the levers. This complication may delay the participant's return to the road race during wheel replacement.

SUMMARY

To address the above issues, a bicycle disc brake caliper is provided. According to a first aspect of the disclosure, the bicycle disc brake caliper comprises a caliper body including a first caliper body part, a second caliper body part and a brake disc slot provided between the first caliper body part and the second caliper body part. The brake disc slot is configured to at least partially accommodate a disc brake rotor removably arranged therein. First and second brake pads are movably arranged in the brake disc slot relative to one another to contact the disc brake rotor arranged at least partially in a space between the first and second brake pads, when the disc brake rotor is arranged in the brake disc slot. A spacer is movably attached to at least one of the caliper body, the first brake pad and the second brake pad. The spacer is configured to be positioned in a first position outside the space when the disc brake rotor is arranged in the brake disc slot, and the spacer is configured to move from the first position to a second position in which the spacer is positioned in the space when the disc brake rotor is removed from the brake disc slot. One potential advantage of this configuration is that the spacer ensures that the first and second brake pads do not become stuck together if a brake actuation device is accidently operated while the disc brake rotor is absent from the brake disc slot.

In a second aspect based on the first aspect, the spacer may be configured to be movably attached to the caliper body. One potential advantage of this configuration is that the spacer may move between the first position and the second position while remaining securely attached to the caliper body.

In a third aspect based on the first through second aspects, the spacer may be configured to be pivotally mounted on the caliper body. One potential advantage of this configuration is that the spacer can move between the first position and the second position in a secure and fluid manner.

In a fourth aspect based on the first through third aspects, the bicycle disc brake caliper may be configured to further comprise a biasing member coupled to the spacer so as to bias the spacer toward the second position. One potential advantage of this configuration is that the biasing member acts to urge the spacer to the second position, which may be useful in deploying the spacer.

In a fifth aspect based on the first through fourth aspects, the spacer may be configured to move from the first position to the second position automatically when the disc brake rotor is removed from the brake disc slot. One potential advantage of this configuration is that no additional effort is required by a user in order to ensure that a first and second brake pads are protected from becoming stuck together if a brake actuation device is accidently operated while a disc brake rotor is absent from a brake disc slot.

In a sixth aspect based on the fifth aspect, the spacer may be configured to be held in the first position by a magnetic force. One potential advantage of this configuration is that the spacer and the disc brake rotor may be held by the magnet so they do not inadvertently contact one another in the first position, thus inhibiting unintentional wear of the spacer and the disc brake rotor that would result from friction if they were in direct contact while the disc brake rotor rotated during use of a bicycle.

In a seventh aspect based on the first through fourth aspects, the spacer may be configured to move from the first position to the second position under a manual influence of a user. One potential advantage of this configuration is that it allows the user to decide whether to keep the spacer in the first position, out of the brake disc slot, or to put the spacer in the second position, within the space between the first and second brake pads.

In an eighth aspect based on the seventh aspect, spacer may be configured to be held in the first position by engagement of a snap fit engagement structure. One potential advantage of this configuration is that the snap fit structure keeps the spacer from contacting the disc brake rotor while the disc brake rotor is installed in the brake disc slot, which prevents wear that would result from friction between the spacer and the disc brake rotor if they were in direct contact while the disc brake rotor rotated during use.

In a ninth aspect based on the eighth aspect, the spacer may be configured to move from the first position to the second position by a force applied by a user that overcomes a resistance of the snap fit engagement structure. One potential advantage of this configuration is that the resistance required to be overcome in order to move the spacer past the snap fit engagement structure ensures that the spacer does not accidentally move between the first position and the second position without the force applied by a user.

In a tenth aspect based on the first through ninth aspects, the bicycle disc brake caliper may be configured to further comprise a first piston provided on the first caliper body part to move the first brake pad toward the second brake pad. One potential advantage of this configuration is that the first and second brake pads are squeezed towards each other upon actuation of the first piston.

In an eleventh aspect based on the first through tenth aspects, the bicycle disc brake caliper may be configured to further comprise a second piston provided on the second caliper body part to move the second brake pad toward the first brake pad. One potential advantage of this configuration is that the first and second brake pads are squeezed towards each other upon actuation of the second piston.

In a twelfth aspect based on the first through eleventh aspects, the spacer may be configured to comprise a resin material. One potential advantage of this configuration is that the spacer is lightweight yet durable.

In a thirteenth aspect based on the first through twelfth aspects, the disc brake rotor may be configured to be removed from the brake disc slot integrally with a wheel hub. One potential advantage of this configuration is that a wheel can be easily removed and/or replaced on a bicycle without the added work of removing the disc brake rotor.

In a fourteenth aspect based on the first through thirteenth aspects, the spacer may be configured to include a main body movably provided on the caliper body and a roller provided on the main body, the roller being configured to rotate on the disc brake rotor when the spacer is positioned in the first position. One potential advantage of this configuration is that the roller rotated on the disc brake rotor while the disc brake rotor is installed in the brake disc slot instead of rubbing, which inhibits wear that would result from friction between the spacer and the disc brake rotor if they were in direct contact without a roller while the disc brake rotor rotated during use of a bicycle.

In a fifteenth aspect based on the first through fourteenth aspects, the first and second brake pads are moved relative to one another by a hydraulic flow. One potential advantage of this configuration is that a hydraulic flow provides a faster and more sensitive transfer of a signal from a brake actuation device to the first and second brake pads, relative to other conventional methods.

In a sixteenth aspect based on the first through fourteenth aspects, the first and second brake pads are moved relative to one another by a cable movement. One potential advantage of this configuration is that cable operated braking systems are less expensive to manufacture, yet provide sufficient responsiveness for most riding scenarios.

In a seventeenth aspect based on the first through sixteenth aspects, the spacer and the disc brake rotor may be configured to have substantially the same thickness. One potential advantage of this configuration is that the spacer and the disc brake rotor can fit interchangeably in the space between the first and second brake pads.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

Figure 1:
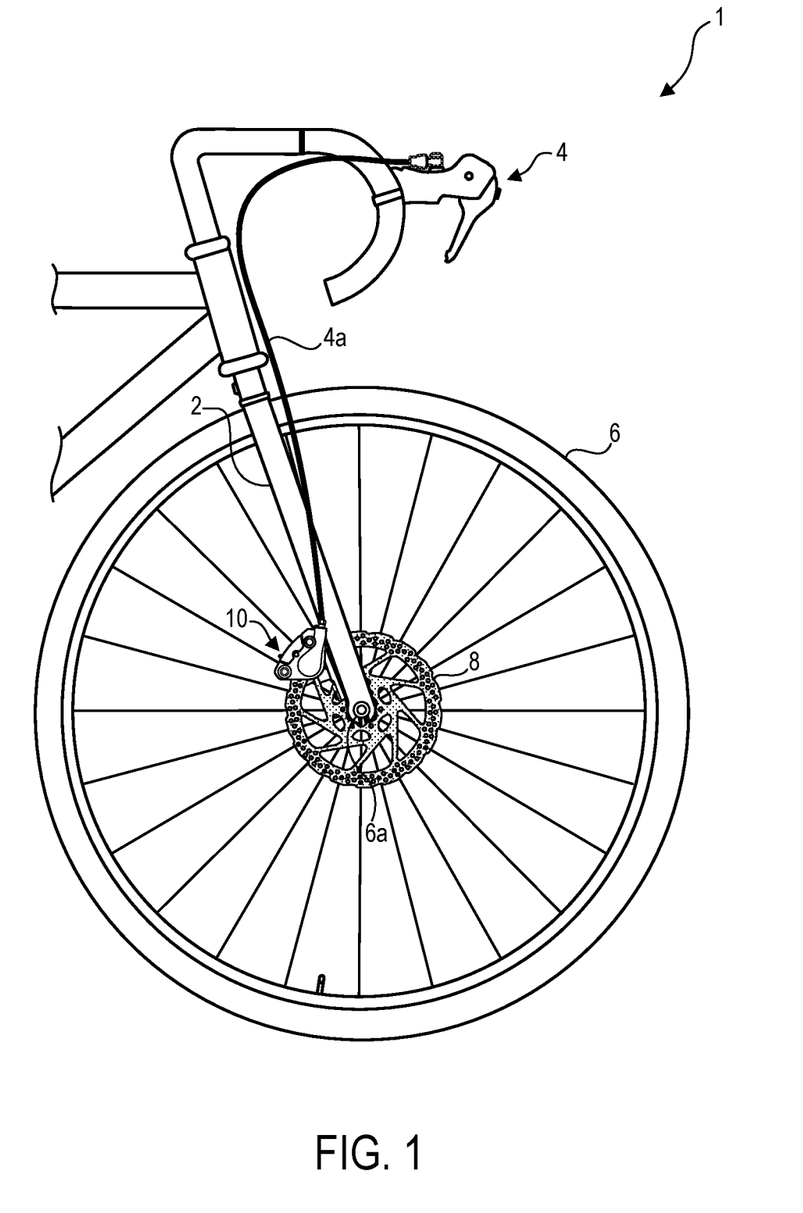
FIG. 1 is a side elevational view of a front half of a bicycle having a bicycle disc brake caliper.

Referring initially to FIG. 1, a bicycle 1 is illustrated to include a frame 2, a brake actuation device 4, actuation transmitter 4a, a wheel 6 with a wheel hub 6a, a disc brake rotor 8, and a bicycle disc brake caliper 10. The bicycle disc brake caliper 10 is mounted to the frame 2 of the bicycle 1 and the disc brake rotor 8 is fixedly attached to the wheel hub 6a. The brake actuation device 4 is operatively connected to the bicycle disc brake caliper 10 via the actuation transmitter 4a. In response to actuation of the brake actuation device 4, the bicycle disc brake caliper 10 is configured to engage the disc brake rotor 8 to slow rotation of the wheel 6.

For the sake of brevity, the bicycle 1 and its various components will not be discussed or illustrated in detail herein, except as these components relate to the bicycle disc brake caliper 10 in accordance with the preferred embodiments of the present invention, as discussed below.

Although only the front portion of the bicycle 1 is depicted in FIG. 1, it should be understood from the drawings and the description herein that the bicycle 1 also includes a rear wheel, and a rear brake system having a brake actuation device, an actuation transmitter, and a bicycle disc brake caliper. Since features of both front and rear brake systems are the same, description of rear portions of the bicycle 1 and rear portions of the brake system are omitted for the sake of brevity.

Figure 2:
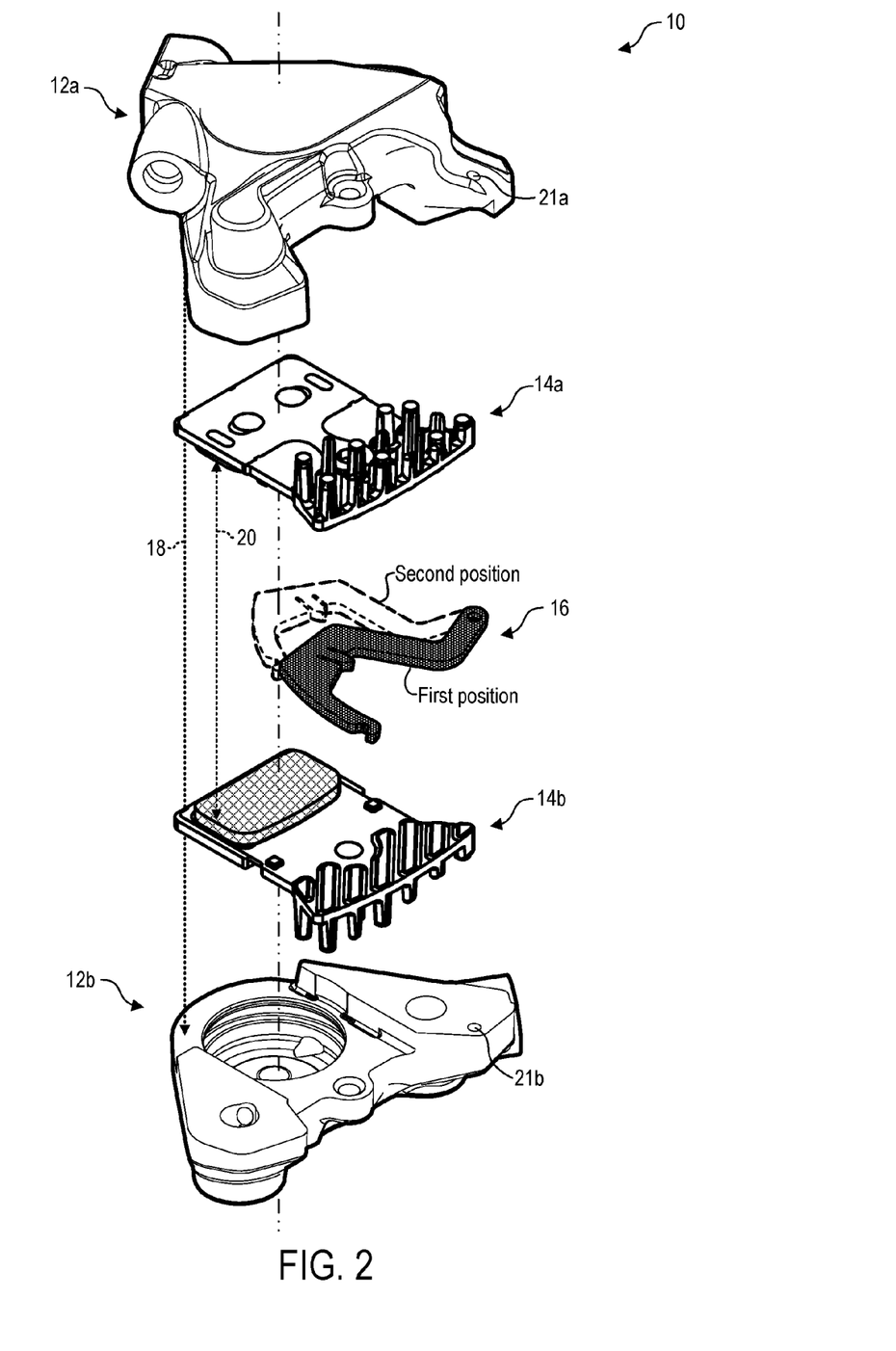
FIG. 2 is an exploded view of a bicycle disc brake caliper, showing a caliper body including first and second caliper body parts, first and second brake pads, and a spacer in accordance with a first embodiment of the present disclosure.

Referring to FIG. 2, the bicycle disc brake caliper 10 of a first embodiment is illustrated. The bicycle disc brake caliper 10 includes a caliper body 12, first and second brake pads 14, and a spacer 16.

The caliper body 12 includes a first caliper body part 12a, a second caliper body part 12b, and a brake disc slot 18 provided between the first caliper body part 12a and the second caliper body part 12b. The first and second caliper body parts 12a and 12b are fixedly connected together with, for example, threaded fittings T (FIG. 4) or the like, but any suitably secure fixing method could be implemented. The brake disc slot 18 is configured to at least partially accommodate the disc brake rotor 8 that is removably arranged therein. The disc brake rotor 8 is arranged at least partially in a space 20 between the first and second brake pads 14a and 14b.

Figure 3A:
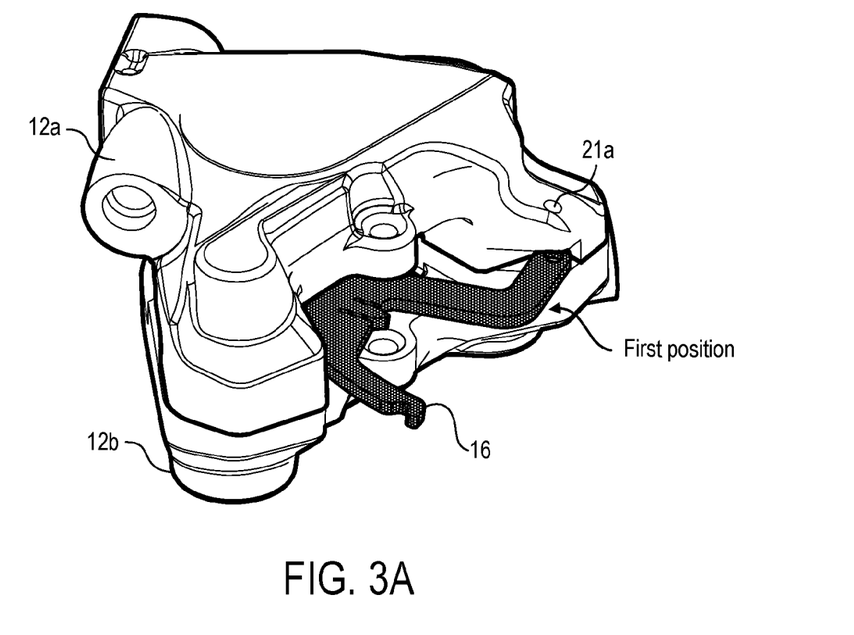
FIGS. 3A and 3B show assembled views of first and second positions of the spacer within the caliper body, in accordance with the first embodiment of the present disclosure.
Figure 3B:
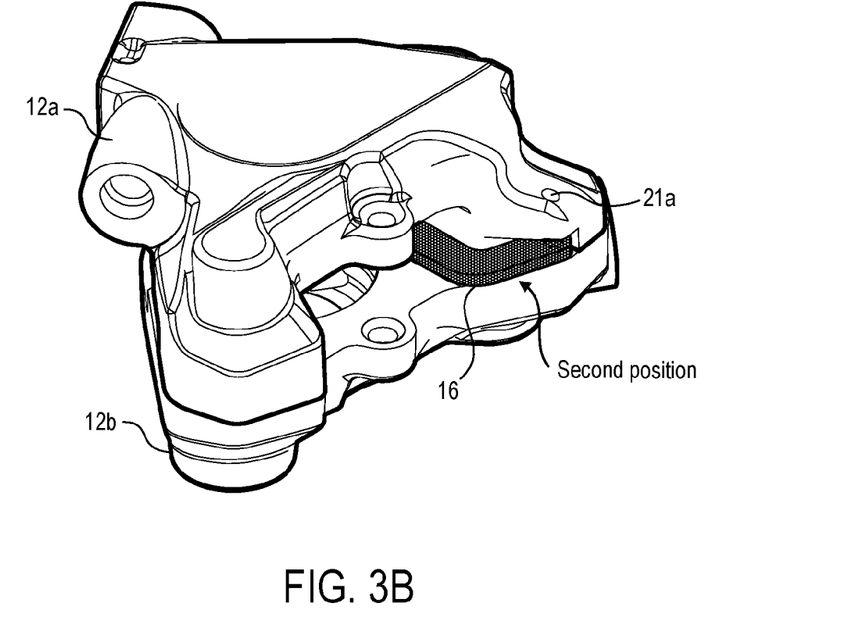

The spacer 16 is movably attached to at least one of the caliper body 12, the first brake pad 14a and the second brake pad 14b. Alternatively, the spacer 16 may be movably attached to a spacer pin 17 (FIG. 4) or other suitable structure. As shown in FIGS. 2 and 3, the spacer 16 is movably attached to the caliper body 12 in this embodiment. The spacer 16 is configured to be positioned in a first position outside the space 20 when the disc brake rotor 8 is arranged in the brake disc slot 18. Further, the spacer 16 is configured to move from the first position to a second position in which the spacer 16 is positioned in the space 20 when the disc brake rotor 8 is removed from the brake disc slot 18. To fit interchangeably in the space 20, the spacer 16 and the disc brake rotor 8 preferably have substantially the same thickness. The spacer 16 preferably comprises a resin material, although any suitable rigid material may be utilized for the spacer 16 as needed and/or desired. By introducing the spacer 16 between the first and second brake pads 14a and 14b upon removal of the disc brake rotor 8 from the brake disc slot 18, the first and second brake pads 14a and 14b are protected from becoming stuck together if the brake actuation device 4 is accidently operated while the disc brake rotor 8 is absent from the brake disc slot 18.

In the embodiments of the present disclosure, the actuation transmitter 4a may be either a hydraulic hose or a cable. The actuation transmitter 4a extends between the brake actuation device 4 and the bicycle disc brake caliper 10 to transmit an actuation force or signal from the brake actuation device 4 to the bicycle disc brake caliper 10 in response to an operation of the brake actuation device 4. In the embodiments of the present disclosure, upon actuation of the brake actuation device 4, a hydraulic flow is transmitted from the brake actuation device 4 to the first and second brake pads 14a and 14b of the bicycle disc brake caliper 10. The first and second brake pads 14a and 14b are operated by hydraulic fluid. In more detail, actuation of the brake actuation device 4 causes a transmission of the hydraulic fluid through the actuation transmitter 4a to the first and second brake pads 14a and 14b. This hydraulic flow causes the first and second brake pads 14a and 14b to grip the disc brake rotor 8 to slow rotation of the wheel 6. When the actuation transmitter 4a is a cable, an actuation force or signal from the brake actuation device 4 is transmitted to the bicycle disc brake caliper 10 as a mechanical force. Thus, the first and second brake pads 14a and 14b may be operated by a cable to causes the bicycle disc brake caliper 10 to grip the disc brake rotor 8.

Figure 4:
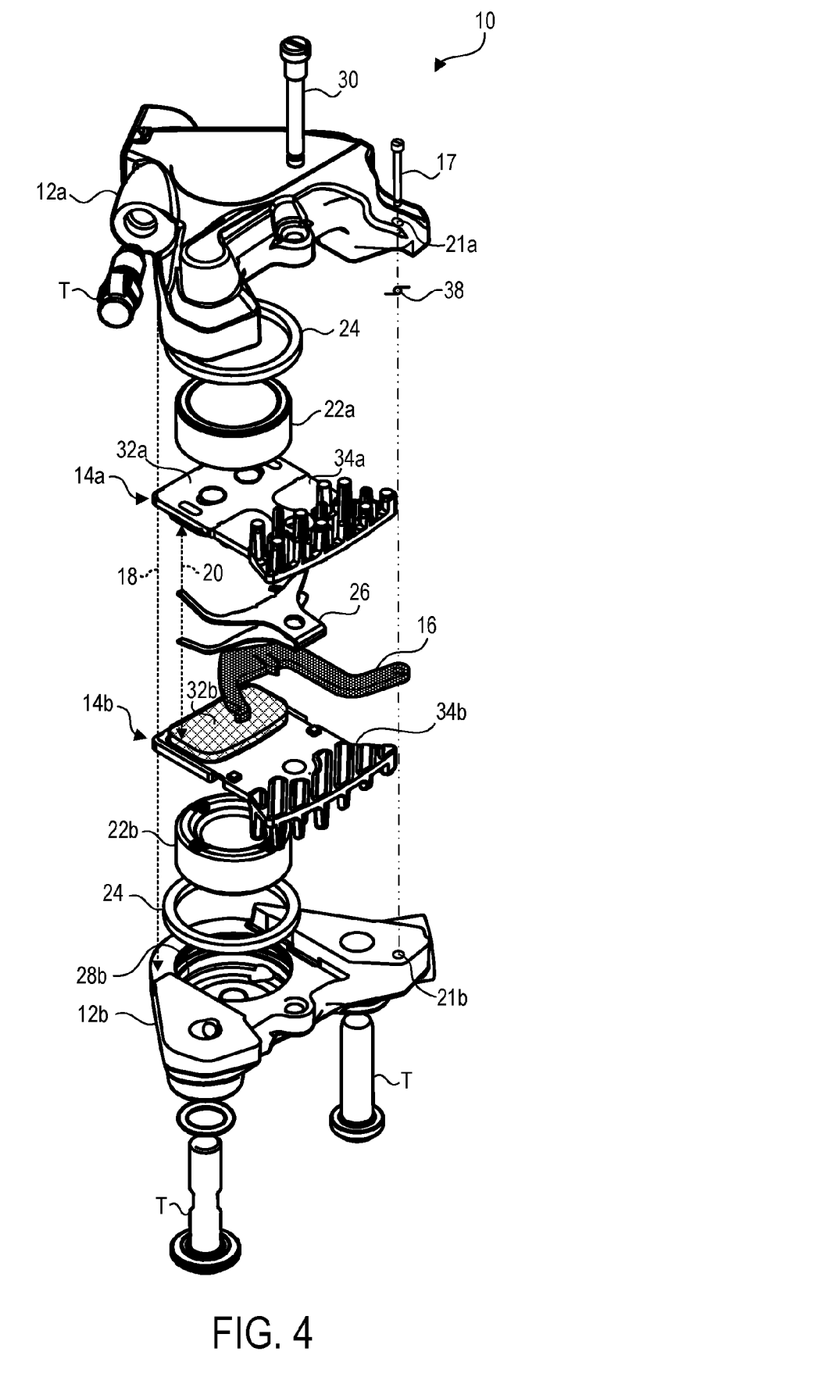
FIG. 4 is an exploded view of the bicycle disc brake caliper, showing a plurality of sealing members, first and second pistons, a brake pad return spring, threaded fittings, and a pin in addition to FIG. 2, in accordance with a first embodiment of the present disclosure.

Referring now to FIG. 4, the first and second caliper body parts 12a and 12b contain pin holes 21a and 21b configured to accept the spacer pin 17 therethrough. When the spacer pin 17 is installed through the pin holes 21a and 21b of the first and second caliper body parts 12a and 12b and the spacer 16, the spacer 16 is secured within the bicycle disc brake caliper 10 and the spacer 16 is pivotally mounted on the caliper body 12. The spacer 16 pivots around the spacer pin 17 to move between the first position and the second position. By mounting the spacer 16 on the spacer pin 17, the spacer 16 can move between the first position and the second position in a secure and fluid manner.

The bicycle disc brake caliper 10 may also include a plurality of pistons 22, a plurality of sealing members 24, and a brake pad return spring 26. A first piston 22a is provided on the first caliper body part 12a to squeeze the first brake pad 14a upon actuation of the brake actuation device 4, and a second piston 22b is provided on the second caliper body part 12b to squeeze the second brake pad 14b upon actuation of the brake actuation device 4.

The first and second caliper body parts 12a and 12b have piston receiving openings 28a and 28b. The piston receiving openings 28a and 28b are preferably annular openings sized and configured to receive the first and second pistons 22a and 22b therein, respectively. Moreover, the piston receiving openings 28a and 28b also preferably include a circumferential groove for receiving one of the sealing members 24 for preventing fluid from escaping therefrom. The bicycle disc brake caliper 10 is fixedly coupled to the frame 2 of the bicycle 1 via the caliper body 12. The caliper body 12 is preferably formed of rigid metallic material such as cast aluminum, although any suitable rigid material may be utilized for the caliper body 12 as needed and/or desired.

The first and second brake pads 14a and 14b are coupled to the caliper body 12 to form the brake disc slot 18 therebetween. A pin 30 is provided for mounting the first and second brake pads 14a and 14b and the brake pad return spring 26 in the brake disc slot 18. At least one of the first and second brake pads 14a and 14b is movable relative to caliper body 12, and preferably both brake pads 14 are movable relative to caliper body 12. Thus, the first and second brake pads 14a and 14b are movably mounted to the first and second caliper body parts 12a and 12b. The first and a second brake pads 14a and 14b are movably arranged in the brake disc slot 18 relative to one another to contact the disc brake rotor 8 arranged at least partially in a space 20 between the first and second brake pads 14a and 14b, when the disc brake rotor 8 is arranged in the brake disc slot 18. The brake pad return spring 26 is a metal member that is disposed between the first and second brake pads 14a and 14b to bias the first and second brake pads 14a and 14b away from one another. As an alternative of this embodiment, only one piston can be movably coupled to a caliper body 12 and one of two brake pads can be moved if needed and/or desired.

As shown in FIGS. 2 and 4, the first and second brake pads 14a and 14b basically include friction portions 32a and 32b with a friction material fixedly coupled thereto, and heat insulating portions 34a and 34b configured to dissipate heat transferred to the pistons 22a and 22b from the friction portions 32a and 32b. The friction portions 32a and 32b and the heat insulating portion 34a and 34b include mounting holes for slidably receiving the pin 30 therethrough. However, bicycle disc brake calipers including brake pads without heat insulating portions are within the scope of the present invention, as long as the bicycle disc brake caliper includes a spacer as described above.

The first and second brake pads 14a and 14b are actuatable to squeeze toward each other upon operation of the brake actuation device 4. Actuation causing the plurality of pistons 22a and 22b to move towards each other and squeezes the first and second brake pads 14a and 14b to contact the disc brake rotor 8 when the disc brake rotor 8 is arranged in the brake disc slot 18. Engagement of the disc brake rotor 8 by the first and second brake pads 14a and 14b acts to stop rotation of the disc brake rotor 8, the wheel hub 6a, and the wheel 6.

Figure 5A:
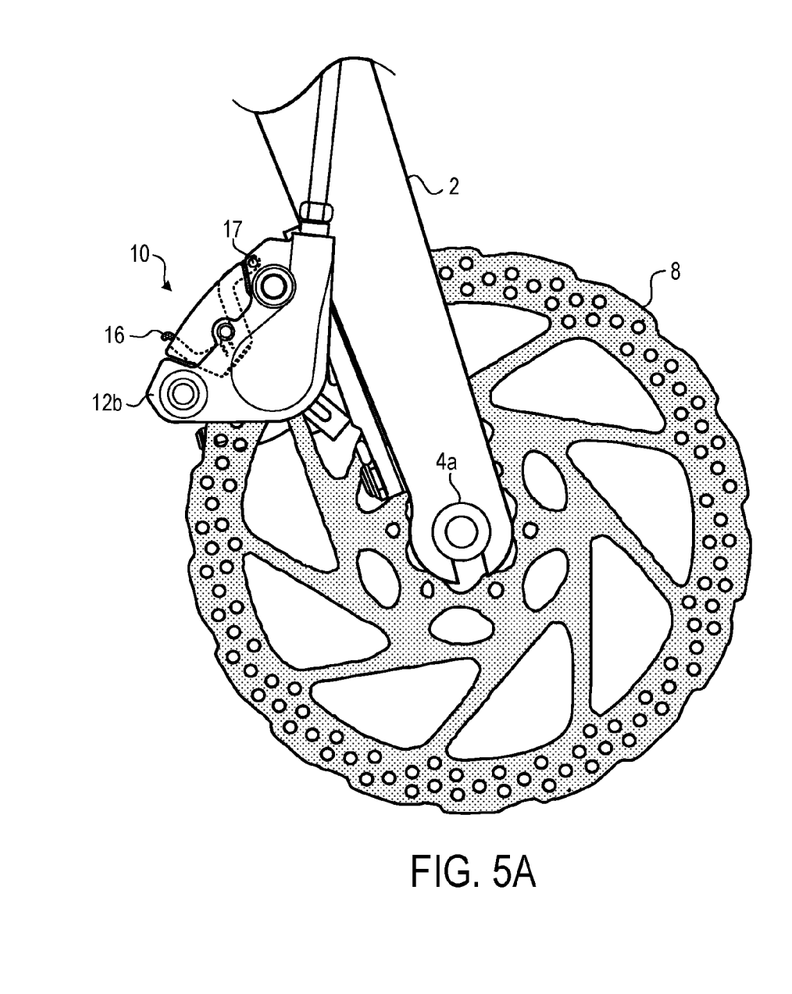
FIGS. 5A and 5B show two elevational views of the bicycle disc brake caliper mounted to a frame of a bicycle with a disc brake rotor positioned within a brake disc slot of the bicycle disc brake caliper in accordance with the first embodiment of the present disclosure.
Figure 5B:
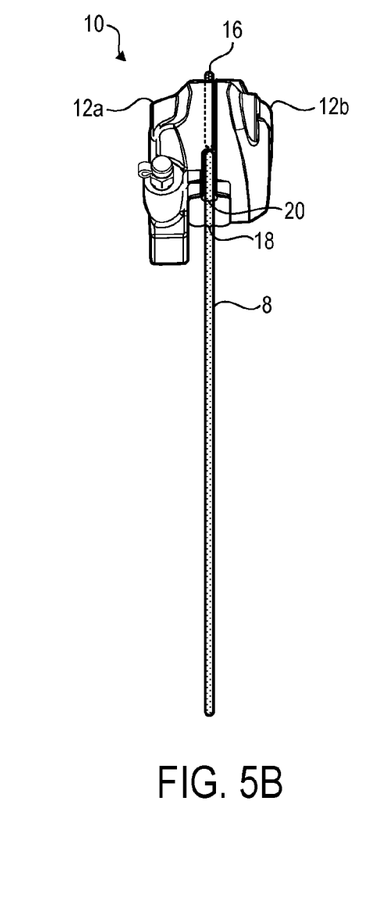

As shown in FIGS. 5A and 5B, when the disc brake rotor 8 is installed to the frame of the bicycle 1, the disc brake rotor 8 is arranged in the brake disc slot 18, and the spacer 16 is configured to be in the first position, out of the brake disc slot 18.

Figure 6A:
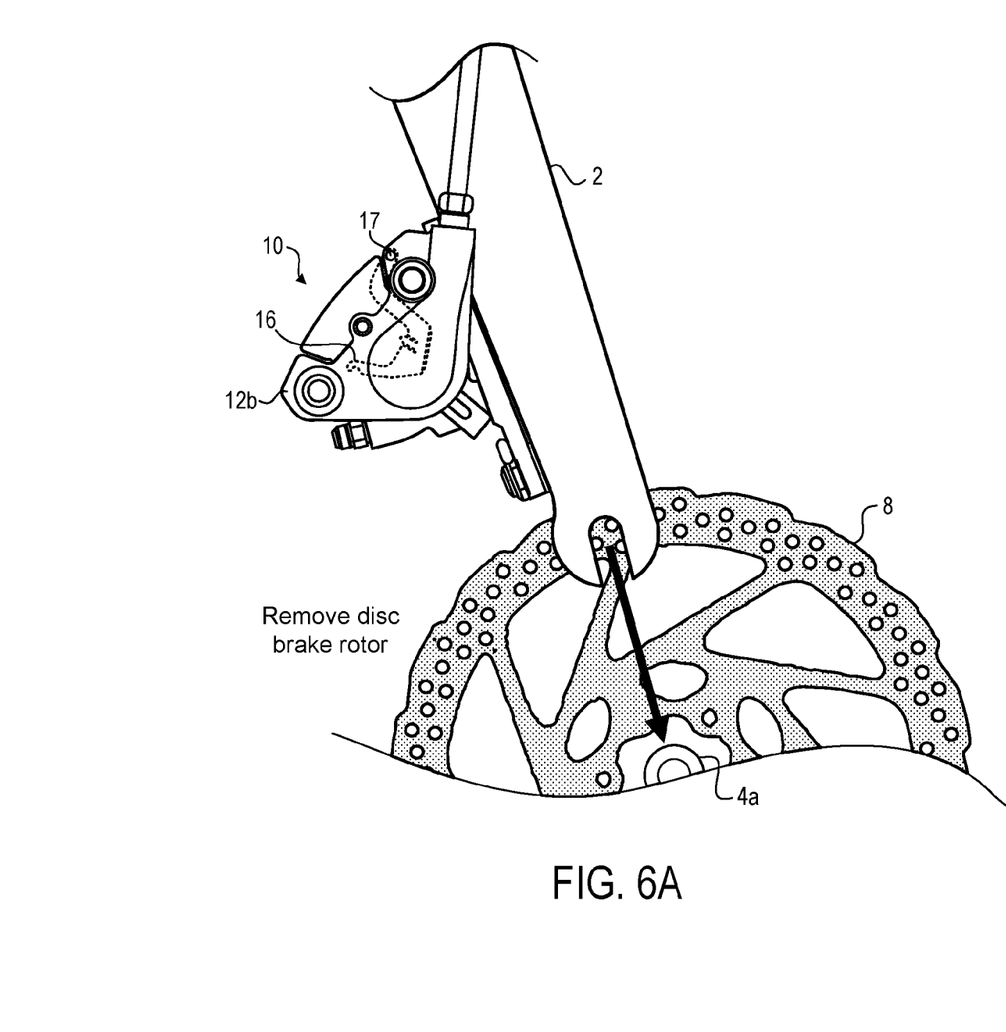
FIGS. 6A and 6B show two elevational views of the bicycle disc brake caliper mounted to the frame of the bicycle with the disc brake rotor removed from the brake disc slot integrally with a wheel hub in accordance with the first embodiment of the present disclosure.
Figure 6B:
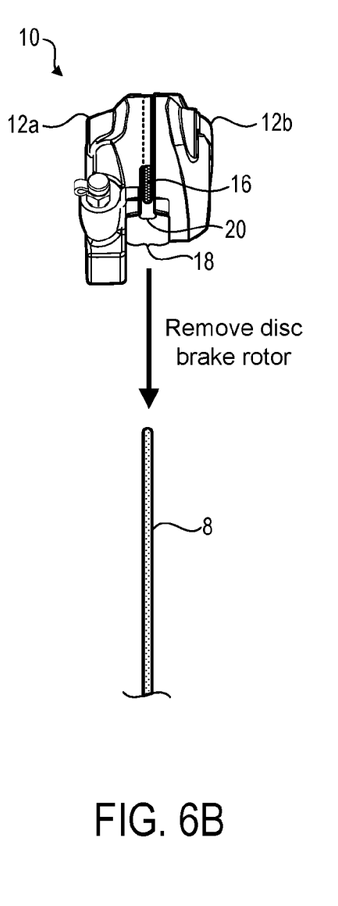

As shown in FIGS. 6A and 6B, the disc brake rotor 8 is removed from the brake disc slot 18 when the wheel 6 is removed from the bicycle 1 since the disc brake rotor 8 is integral with the wheel hub 6a. In this state, the spacer 16 is configured to move into the second position, at least partially within the brake disc slot 18. This configuration allows the wheel 6 to be easily removed and/or replaced on a bicycle 1 without the added work of removing the disc brake rotor 8.

Figure 7A:
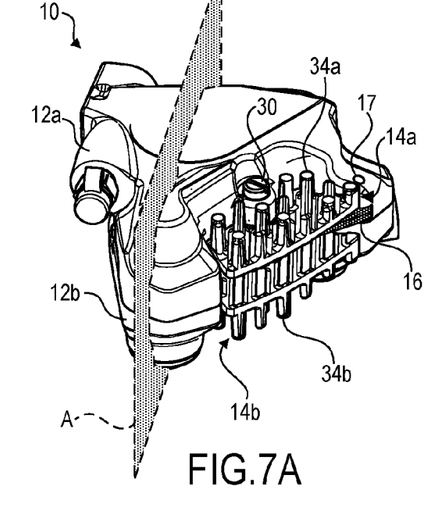
FIG. 7A shows an assembled view of the bicycle disc brake caliper in accordance with the first embodiment of the present disclosure.
Figure 7B:
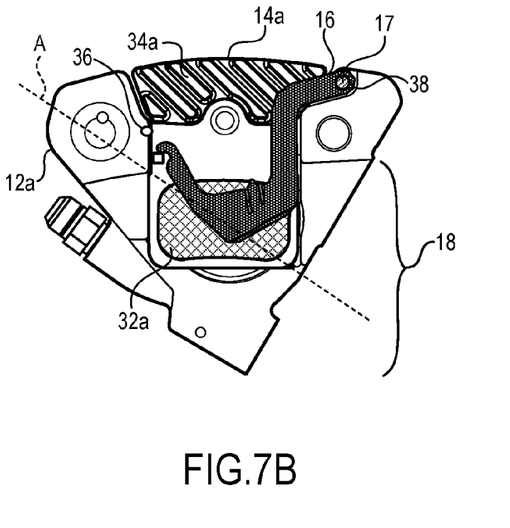
FIG. 7B is a partially assembled view of the bicycle disc brake caliper, showing only the first caliper body part, the first brake pad and the spacer in accordance with the first embodiment of the present disclosure.
Figure 7C:
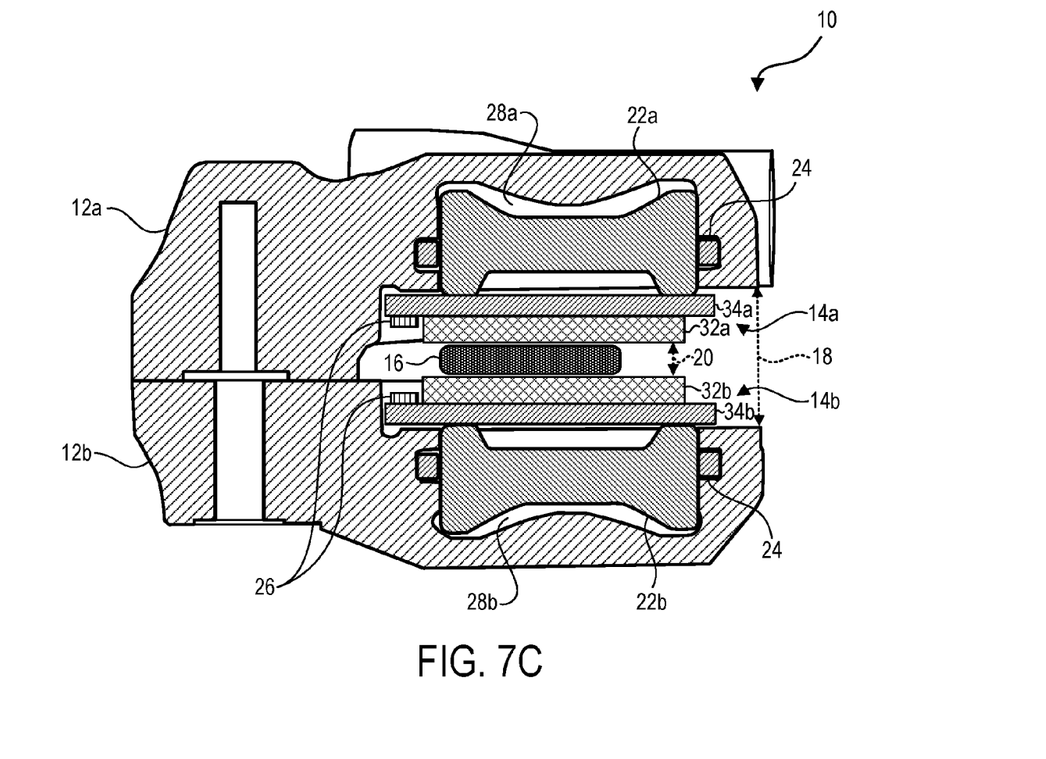
FIG. 7C shows a cross-sectional view of the bicycle disc brake caliper in accordance with the first embodiment of the present disclosure.

Referring now to FIGS. 7A, 7B, and 7C, the bicycle disc brake caliper 10 is shown with the spacer 16 in the second position. FIGS. 7A and 7B indicate the cutting plane A for the cross section of the bicycle disc brake caliper 10 shown in FIG. 7C.

As shown in FIG. 7C, the spacer 16 is configured to be partially inside the space 20 between the first and second brake pads 14a and 14b when the disc brake rotor 8 is absent from the brake disc slot 18. Since the spacer 16 is configured to have substantially the same thickness as the disc brake rotor 8, the spacer 16 and the disc brake rotor 8 fit interchangeably within the space 20. When the disc brake rotor 8 is not arranged in the brake disc slot 18, operation of the brake actuation device 4 causes the first and second pistons 22a and 22b to push the first and second brake pads 14a and 14b toward each other to contact the spacer 16. Since the spacer 16 and the disc brake rotor 8 fit interchangeably within the space 20, the first and second brake pads 14a and 14b contact the spacer 16 in a manner similar to the first and second brake pads 14a and 14b contacting the disc brake rotor 8 when the disc brake rotor 8 is arranged in the brake disc slot 18. The presence of the spacer 16 in the space 20 inhibits the first and second brake pads 14a and 14b from coming in to direct contact with one another if the brake actuation device 4 is operated when the disc brake rotor 8 is absent from the brake disc slot 18.

Figure 8A:
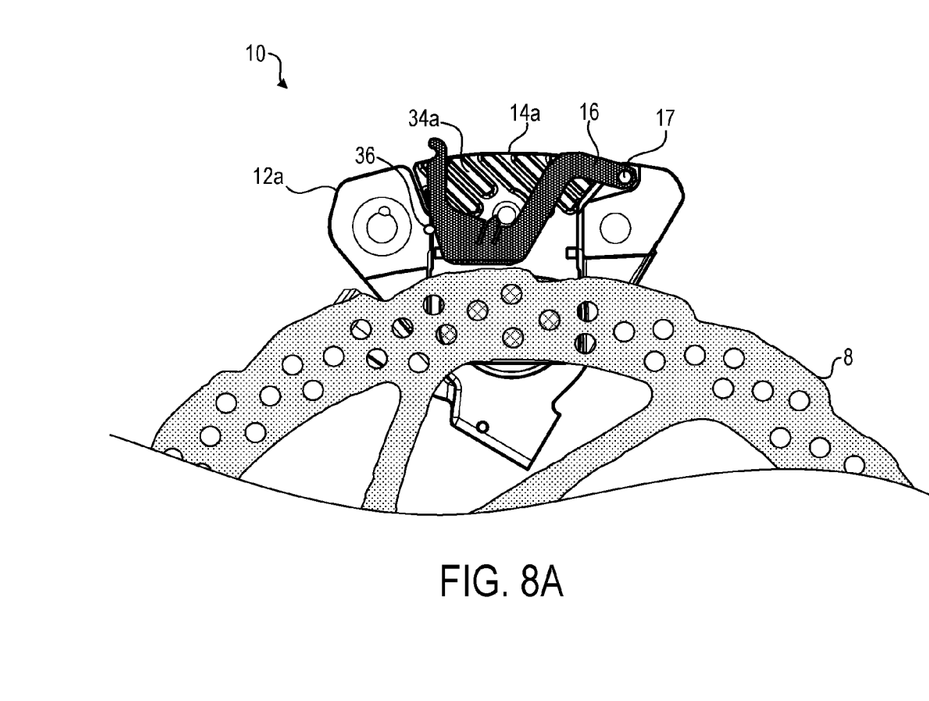
FIGS. 8A and 8B are partially assembled views of the bicycle disc brake caliper, showing the first caliper body part, the first brake pad and the spacer, with FIG. 8A having a state in which the disc brake rotor is arranged in the brake disc slot and FIG. 8B having a state in which the disc brake rotor is removed from the brake disc slot in accordance with the first embodiment of the present disclosure.
Figure 8B:
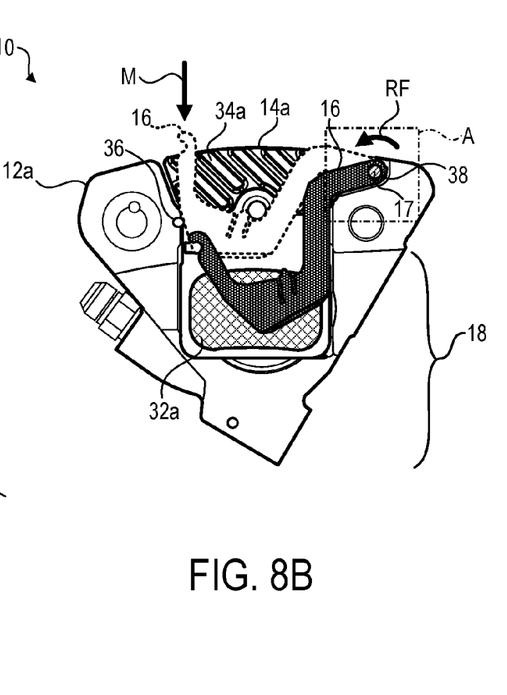

As shown in FIGS. 8A and 8B, in the first embodiment the spacer 16 is configured to be held in the first position by engagement of a snap fit engagement structure 36. The snap fit engagement structure 36 provides a resistance that must be overcome in order for the spacer 16 to move from the first position to the second position. Thus the snap fit engagement structure 36 keeps the spacer 16 out of direct contact with the disc brake rotor 8 when the disc brake rotor 8 is arranged in the brake disc slot 18. This inhibits wear of the spacer 16 and the disc brake rotor 8 that would result from friction between the spacer 16 and the disc brake rotor 8 if they were in direct contact while the disc brake rotor 8 rotates during use of the bicycle 1.

According to the first embodiment, when the disc brake rotor 8 is removed from the brake disc slot 18, the spacer 16 is configured to move from the first position to the second position under the manual influence M of a user. This allows the user to decide whether to keep the spacer 16 in the first position out of the brake disc slot 18, or to put the spacer 16 in the second position in the space 20 between the first and second brake pads 14a and 14b. The spacer 16 is configured to move from the first position to the second position by a force applied by the user that overcomes the resistance of the snap fit engagement structure 36. Conversely, if the spacer 16 is in the second position and the disc brake rotor 8 is inserted into the brake disc slot 18, the resistance of the snap fit engagement structure 36 must be overcome by a force applied by the user while inserting the disc brake rotor 8. During insertion, the disc brake rotor 8 contacts the spacer 16 and the force is transferred from the disc brake rotor 8 to the spacer 16 to move the spacer 16 from the second position, past the snap fit engagement structure 36, and into the first position. The resistance required to be overcome by the user in order to move the spacer 16 past the snap fit engagement structure 36 ensures that the spacer 16 does not accidentally move between the first position and the second position without the force applied by a user.

Figure 9:
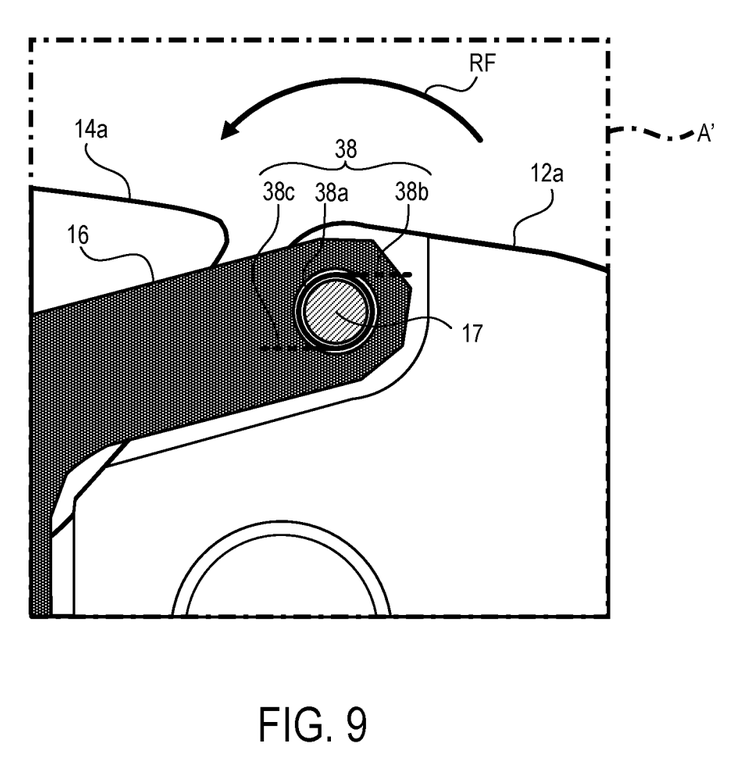
FIG. 9 is an expanded view A' of view A in the partially assembled bicycle disc brake caliper in FIG. 8B showing the biasing member.

As shown in FIGS. 8B and 9, a biasing member 38 may be coupled to the spacer 16 so as to bias the spacer 16 toward the second position. The biasing member 38 is preferentially a torsion spring having a coil portion 38a, first end portion 38b and second end portion 38c. The coil portion 38a is arranged around the spacer pin 17, the first end portion 38b is engaged to the caliper body 12 and the second end portion 38c is engaged to the spacer 16 to bias the spacer 16 toward the second position. The biasing member 38 provides a rotational force RF that biases the spacer 16 to pivot around the spacer pin 17 toward the second position in the brake disc slot 18. The spacer 16 cannot move closer to the second position without overcoming the resistance of the snap fit engagement structure 36. Further, the spacer 16 must overcome the rotational force RF of the biasing member 38 to rotate away from the second position. Thus, the biasing member 38 stabilizes the spacer 16 in both the first and second positions. In other words, the biasing member 38 acts to secure the spacer 16 in either the first position (see dotted line) or the second position (see solid line) once the spacer 16 is in one of the positions.

Figure 10A:
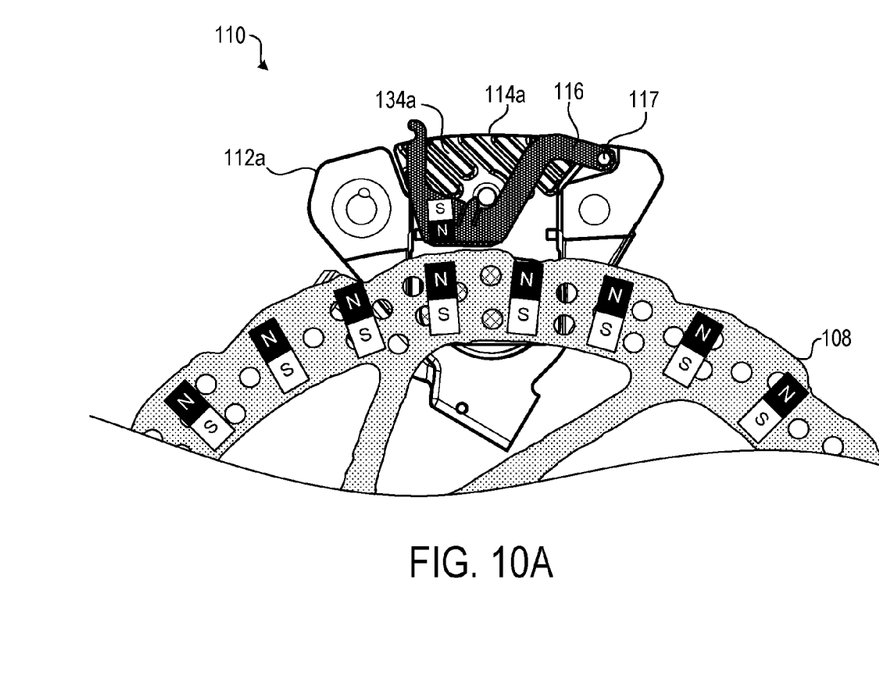
FIGS. 10A and 10B are partially assembled views of a bicycle disc brake caliper, showing a first caliper body part, a first brake pad and a spacer, with FIG. 10A having a state in which a disc brake rotor is arranged in a brake disc slot and FIG. 10B having a state in which the disc brake rotor is removed from the brake disc slot in accordance with a second embodiment of the present disclosure.
Figure 10B:
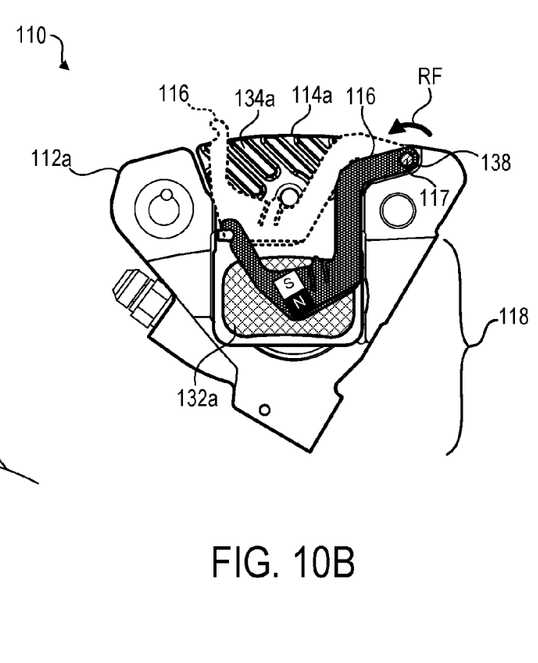

Referring to FIGS. 10A and 10B, a bicycle disc brake caliper 110 is provided according to a second embodiment of the present disclosure. Since the bicycle disc brake caliper 110 is generally similar to that of the first embodiment with the exception of the mechanism to bias the spacer 116 towards the first position when the disc brake rotor 108 is arranged in the brake disc slot 118, detailed description thereof is abbreviated here for the sake of brevity. It is to be noted that like parts are designated by like reference numerals throughout the detailed description and the accompanying drawings.

As shown in FIG. 10A, the spacer 116 and the disc brake rotor 108 of the second embodiment are formed of magnetized materials, and configured such that the magnetic poles of the spacer 116 and the magnetic poles of the disc brake rotor 108 are oppositely aligned. This opposite alignment results in a repelling magnetic force that causes the spacer 116 and the disc brake rotor 108 to repel each other when they are in close proximity. Thus, when the disc brake rotor 108 is arranged in the brake disc slot 118, the spacer 116 is held in the first position by a magnet, i.e. by the repelling magnetic force created by the oppositely aligned poles of the spacer and the disc brake rotor. The repelling magnetic force between the spacer 116 and the disc brake rotor 108 provides a force that must be overcome in order for the spacer to contact the disc brake rotor 108, keeping the spacer 116 out of direct contact with the disc brake rotor 108 when the disc brake rotor 108 is arranged in the brake disc slot 118. This inhibits wear of the spacer 116 and the disc brake rotor 108 that would result from friction between the spacer 116 and the disc brake rotor 108 if they were in direct contact while the disc brake rotor 108 rotates during use of the bicycle.

As shown in FIG. 10B, a biasing member 138 may be coupled to the spacer 116 so as to bias the spacer 116 toward the second position. More specifically, the biasing member 138 provides a rotational force RF that biases the spacer 116 to pivot around the spacer pin 117 toward the second position in the brake disc slot 118. The biasing member 138 stabilizes the spacer 116 in the first position when the disc brake rotor 108 is arranged in the brake disc slot 118. The spacer 116 must overcome the rotational force RF of the biasing member 138 in order to pivot in a direction away from the second position and the spacer 116 cannot move closer to the second position without overcoming the repelling magnetic force between the spacer 116 and the disc brake rotor 108.

The spacer 116 is configured to move from the first position to the second position automatically when the disc brake rotor 108 is removed from the brake disc slot 118. This automatic movement is a result of the rotational force RF that biases the spacer 116 toward the second position. In the absence of a countering force from the magnetic disc brake rotor 108, the spacer 116 is free to pivot towards the second position. This automatic movement of the spacer 116 protects the first and second brake pads 114a and 114b from becoming stuck together if the brake actuation device is accidently operated while the disc brake rotor 108 is absent from the brake disc slot 118, without requiring added effort from a user.

The biasing member 138 also stabilizes the spacer 116 in the second position after the disc brake rotor 108 is removed from the brake disc slot 118, since the spacer 116 must overcome the rotational force RF of the biasing member 138 to rotate away from the second position.

Figure 11A:
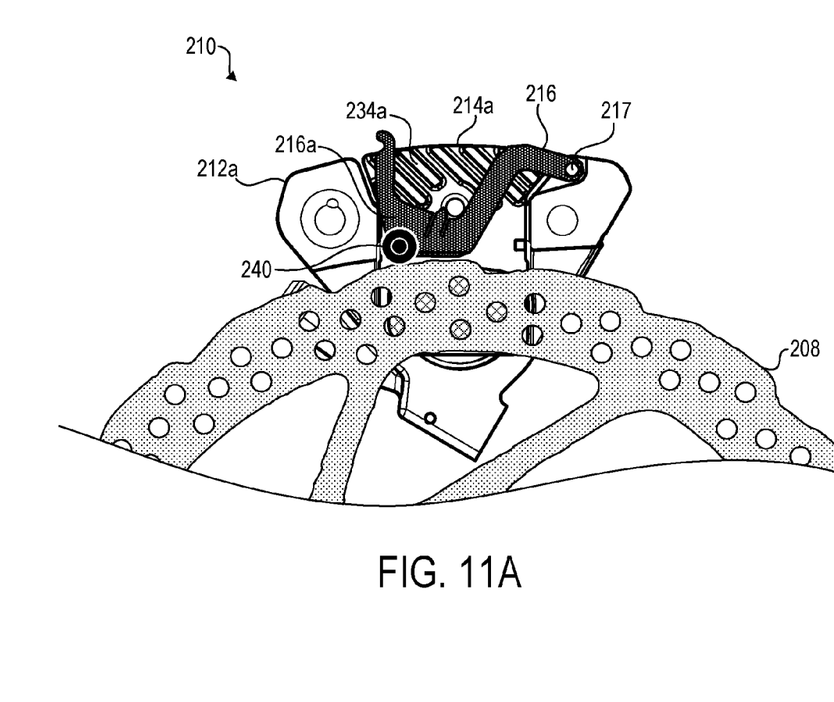
FIGS. 11A and 11B are partially assembled views of a bicycle disc brake caliper, showing a first caliper body part, a first brake pad and a spacer, with FIG. 11A having a state in which a disc brake rotor is arranged in a brake disc slot and FIG. 11B having a state in which the disc brake rotor is removed from the brake disc slot in accordance with the third embodiment of the present disclosure.
Figure 11B:
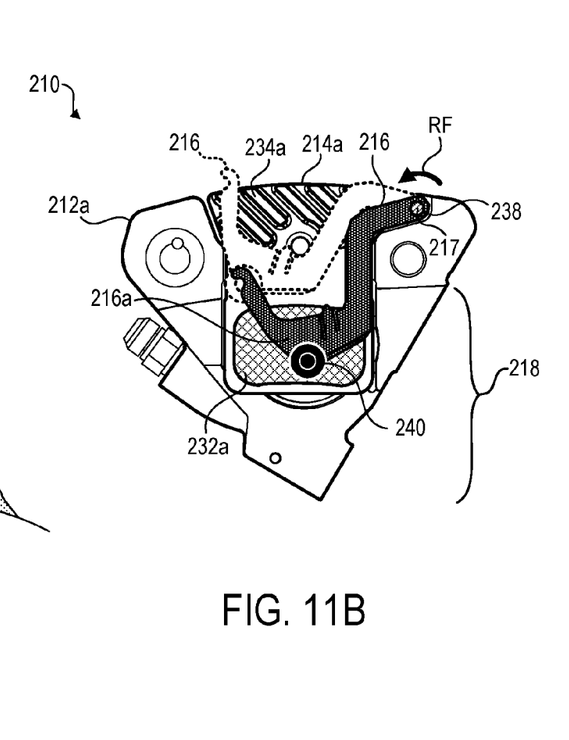

Referring to FIGS. 11A and 11B a bicycle disc brake caliper 210 is provided according to a third embodiment of the present disclosure. Since the bicycle disc brake caliper 210 is generally similar to that of the first embodiment with the exception of the mechanism to bias the spacer 216 towards the first position when the disc brake rotor 208 is arranged in the brake disc slot 218, detailed description thereof is abbreviated here for the sake of brevity. It is to be noted that like parts are designated by like reference numerals throughout the detailed description and the accompanying drawings.

As shown in FIG. 11A, the spacer 216 of the third embodiment includes a main body 216a movably provided on the caliper body (on the first caliper body part 212a, for example) and a roller 240 provided on the main body 216a, the roller 240 being configured to rotate on the disc brake rotor 208 when the spacer 216 is positioned in the first position.

A biasing member 238 is coupled to the spacer 216 so as to bias the spacer 216 toward the second position. More specifically, the biasing member 238 provides a rotational force RF that biases main body 216a of the spacer 216 to pivot around the spacer pin 217 toward the second position in the brake disc slot 218. The biasing member 238 stabilizes the spacer 216 in the first position when the disc brake rotor 208 is arranged in the brake disc slot 218 since the spacer 216 must overcome the rotational force RF of the biasing member 238 in order to pivot in a direction away from the second position. Thus, when the disc brake rotor 208 is arranged in the brake disc slot 218, the spacer 216 is held in the first position by the rotational force RF of the biasing member 238 and the roller 240 on the disc brake rotor 208. When the disc brake rotor 208 is arranged in the brake disc slot 218, the roller 240 of the spacer 216 is in contact with the disc brake rotor 208. Since the roller 240 is configured to rotate smoothly, the configuration of the third embodiment inhibits wear of the spacer 216 and the disc brake rotor 208 that would result from friction between the spacer 216 and the disc brake rotor 208 if they were in direct contact while the disc brake rotor 208 rotates during use of the bicycle.

The spacer 216 is configured to move from the first position to the second position automatically when the disc brake rotor 208 is removed from the brake disc slot 218. This automatic movement is a result of the rotational force RF that biases the spacer 216 toward the second position. In the absence of the disc brake rotor 208 from the brake disc slot 218 the roller 240 is no longer in contact with the disc brake rotor 208 and is free to pivot towards the second position. This automatic movement of the spacer 216 protects the first and second brake pads 214a and 214b from becoming stuck together if the brake actuation device is accidently operated while the disc brake rotor 208 is absent from the brake disc slot 218, without requiring added effort from a user.

Furthermore, the biasing member 238 stabilizes the spacer 216 in the second position after the disc brake rotor 208 is removed from the brake disc slot 218, since the spacer 216 must overcome the rotational force RF of the biasing member 238 to rotate away from the second position.

While specific embodiments of a bicycle disc brake caliper have been described in detail, the particular arrangements disclosed are meant to be illustrative only and not limiting. The features of the various embodiments described above, as well as modifications thereof, may be variously combined without departing from the scope of this disclosure.

The invention claimed is:
1. A bicycle disc brake caliper comprising:
a caliper body including a first caliper body part, a second caliper body part and a brake disc slot provided between the first caliper body part and the second caliper body part, the brake disc slot being configured to at least partially accommodate a disc brake rotor removably arranged therein;
a first and second brake pads movably arranged in the brake disc slot relative to one another to contact the disc brake rotor arranged at least partially in a space between the first and second brake pads, when the disc brake rotor is arranged in the brake disc slot; and
a spacer movably attached to and pivotally mounted on the caliper body, the spacer being configured to be positioned in a first position outside the space when the disc brake rotor is arranged in the brake disc slot, and the spacer being configured to move from the first position to a second position in which the spacer is positioned in the space when the disc brake rotor is removed from the brake disc slot.

2. The bicycle disc brake caliper of claim 1, wherein the first and second brake pads are moved relative to one another by a cable movement.

3. The bicycle disc brake caliper of claim 1, wherein the spacer and the disc brake rotor have substantially the same thickness.

4. The disc brake caliper of claim 1, further comprising a biasing member coupled to the spacer so as to bias the spacer toward the second position.

5. The bicycle disc brake caliper of claim 1, wherein the first and second brake pads are moved relative to one another by a hydraulic flow.

6. The bicycle disc brake caliper of claim 1, wherein the disc brake rotor is removed from the brake disc slot integrally with a wheel hub.

7. The bicycle disc brake caliper of claim 1, wherein the spacer is configured to move from the first position to the second position under a manual influence of a user.

8. The bicycle disc brake caliper of claim 7, wherein the spacer is held in the first position by engagement of a snap fit engagement structure.

9. The bicycle disc brake caliper of claim 8, wherein the spacer is configured to move from the first position to the second position by a force applied by a user that overcomes a resistance of the snap fit engagement structure.

10. The bicycle disc brake caliper of claim 1, further comprising
a first piston provided on the first caliper body part to move the first brake pad toward the second brake pad.

11. The bicycle disc brake caliper of claim 10, further comprising
a second piston provided on the second caliper body part to move the second brake pad toward the first brake pad.

12. The bicycle disc brake caliper of claim 1, wherein the spacer comprises a resin material.

13. A bicycle disc brake caliper comprising:
a caliper body including a first caliper body part, a second caliper body part and a brake disc slot provided between the first caliper body part and the second caliper body part, the brake disc slot being configured to at least partially accommodate a disc brake rotor removably arranged therein;
a first and second brake pads movably arranged in the brake disc slot relative to one another to contact the disc brake rotor arranged at least partially in a space between the first and second brake pads, when the disc brake rotor is arranged in the brake disc slot; and
a spacer movably attached to at least one of the caliper body, the first brake pad and the second brake pad, the spacer being configured to be positioned in a first position outside the space when the disc brake rotor is arranged in the brake disc slot, and the spacer being configured to move from the first position to a second position in which the spacer is positioned in the space when the disc brake rotor is removed from the brake disc slot, wherein
the spacer is configured to move from the first position to the second position automatically when the disc brake rotor is removed from the brake disc slot.

14. The disc brake caliper of claim 13, wherein the spacer is held in the first position by a magnetic force.

15. A bicycle disc brake caliper comprising:
a caliper body including a first caliper body part, a second caliper body part and a brake disc slot provided between the first caliper body part and the second caliper body part, the brake disc slot being configured to at least partially accommodate a disc brake rotor removably arranged therein;
a first and second brake pads movably arranged in the brake disc slot relative to one another to contact the disc brake rotor arranged at least partially in a space between the first and second brake pads, when the disc brake rotor is arranged in the brake disc slot; and
a spacer movably attached to at least one of the caliper body, the first brake pad and the second brake pad, the spacer being configured to be positioned in a first position outside the space when the disc brake rotor is arranged in the brake disc slot, and the spacer being configured to move from the first position to a second position in which the spacer is positioned in the space when the disc brake rotor is removed from the brake disc slot, wherein
the spacer includes a main body movably provided on the caliper body and a roller provided on the main body, the roller being configured to rotate on the disc brake rotor when the spacer is positioned in the first position.

* * * * *